United States Patent
Ou-Yang et al.

(10) Patent No.: US 6,624,966 B1
(45) Date of Patent: Sep. 23, 2003

(54) DISK DRIVE HAVING AIRFLOW SUPPRESSOR COMB FOR REDUCED DISK ROTATION INDUCED AIRFLOW

(75) Inventors: Jin Hui Ou-Yang, San Jose, CA (US); Serge Hauert, San Jose, CA (US); John R. Gustafson, Los Gatos, CA (US); Chiao-Ping Ku, Fremont, CA (US); Lin Yang, San Jose, CA (US); Gary C. Griffin, Boulder Creek, CA (US); Aaron D. Little, Campbell, CA (US); Sudha Narayanan, San Jose, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 26 days.

(21) Appl. No.: 09/872,193

(22) Filed: May 31, 2001

(51) Int. Cl.[7] ............................................. G11B 33/14
(52) U.S. Cl. .................................................. 360/97.02
(58) Field of Search ........................... 360/97.01, 97.02, 360/97.03, 97.04

(56) References Cited

U.S. PATENT DOCUMENTS

| | | | |
|---|---|---|---|
| 5,134,530 A | * | 7/1992 | Hall ......................... 360/97.03 |
| 5,541,791 A | | 7/1996 | Yamasaki et al. |
| 6,271,987 B1 | * | 8/2001 | Allsup et al. ............ 360/97.02 |
| 6,424,487 B2 | * | 7/2002 | Nagl et al. ............... 360/97.01 |

* cited by examiner

Primary Examiner—George J. Letscher
(74) Attorney, Agent, or Firm—Won Tae C. Kim, Esq.; Milad G. Shara, Esq.; Stetina Brunda Garred & Brucker

(57) ABSTRACT

A disk drive including a disk drive base. The disk drive further includes at least one rotatable disk which includes a disk surface extending to an outer disk edge. The disk drive further includes a head stack assembly rotatably attached to the disk drive base in operable communication with the disk. The disk drive further includes an airflow suppressor comb coupled to the disk drive base and stationary relative to the disk drive base during operation of the disk drive. The comb includes a comb body disposed adjacent to the outer disk edge, and at least one tine extending from the comb body along the disk surface for mitigating disk rotation induced airflow upon the head stack assembly adjacent to the disk surface.

2 Claims, 2 Drawing Sheets

DISK DRIVE HAVING AIRFLOW SUPPRESSOR COMB FOR REDUCED DISK ROTATION INDUCED AIRFLOW

CROSS-REFERENCE TO RELATED APPLICATIONS

This application is related to U.S. application Ser. No. 09/872,236entitled DISK DRIVE HAVING AIRFLOW SUPPRESSOR COMB WITH CURVED EXTENSION FOR REDUCED DISK ROTATION INDUCED AIRFLOW, filed on May 31, 2001, incorporated herein by reference.

BACKGROUND OF THE INVENTION

1. Field of the Invention

The present invention relates generally to disk drives, and more particularly to a disk drive having an airflow suppressor comb for reduced disk rotation induced airflow.

2. Description of the Prior Art

The typical hard disk drive includes a disk drive base, a head disk assembly (HDA), and a printed circuit board assembly (PCBA) attached to the disk drive base. The head disk assembly includes at least one magnetic disk, a spindle motor for rotating the disk, and a head stack assembly (HSA) having an actuator assembly having at least one transducer head, typically several, for reading and writing data from the disk. The printed circuit board assembly includes a servo control system in the form of a disk controller for generating servo control signals. The head stack assembly is controllably positioned in response to the generated servo control signals from the disk controller. In so doing, the attached heads are moved relative to tracks disposed upon the disk.

A topic of concern is the desire to reduce the effects of airflow generated within the disk drive due to rotation of the disks. Of particular concern is the occurrence of turbulent airflow which may tend to excite a resonance response of the actuator assembly. This results in an increase in the percent off-track values of the associated head. Further, such disk rotation induced airflow may result in a force applied to the actuator assembly, i.e., windage. In addition, such disk rotation induced airflow may result in vibration of the disk or disk flutter. Accordingly, there is a need in the art for an improved disk drive for mitigation of such disk rotation induced airflow in comparison to the prior art.

SUMMARY OF THE INVENTION

An aspect of the invention can be regarded as a disk drive including a disk drive base. The disk drive further includes at least one rotatable disk which includes a disk surface extending to an outer disk edge. The disk drive further includes a head stack assembly rotatably attached to the disk drive base in operable communication with the disk. The disk drive further includes an airflow suppressor comb coupled to the disk drive base and stationary relative to the disk drive base during operation of the disk drive. The comb includes a comb body disposed adjacent to the outer disk edge, and at least one tine extending from the comb body along the disk surface for mitigating disk rotation induced airflow upon the head stack assembly adjacent to the disk surface.

The tine may include a base portion disposed adjacent to the comb body. The base portion may be sized and configured to contact the outer disk edge upon deflection of the disk. Further, the disk may include a non-data annular region and the tine has a distal portion sized and configured to contact the non-data annular region of the disk upon deflection of the tine.

DESCRIPTION OF THE PREFERRED EMBODIMENTS

Figure 1:
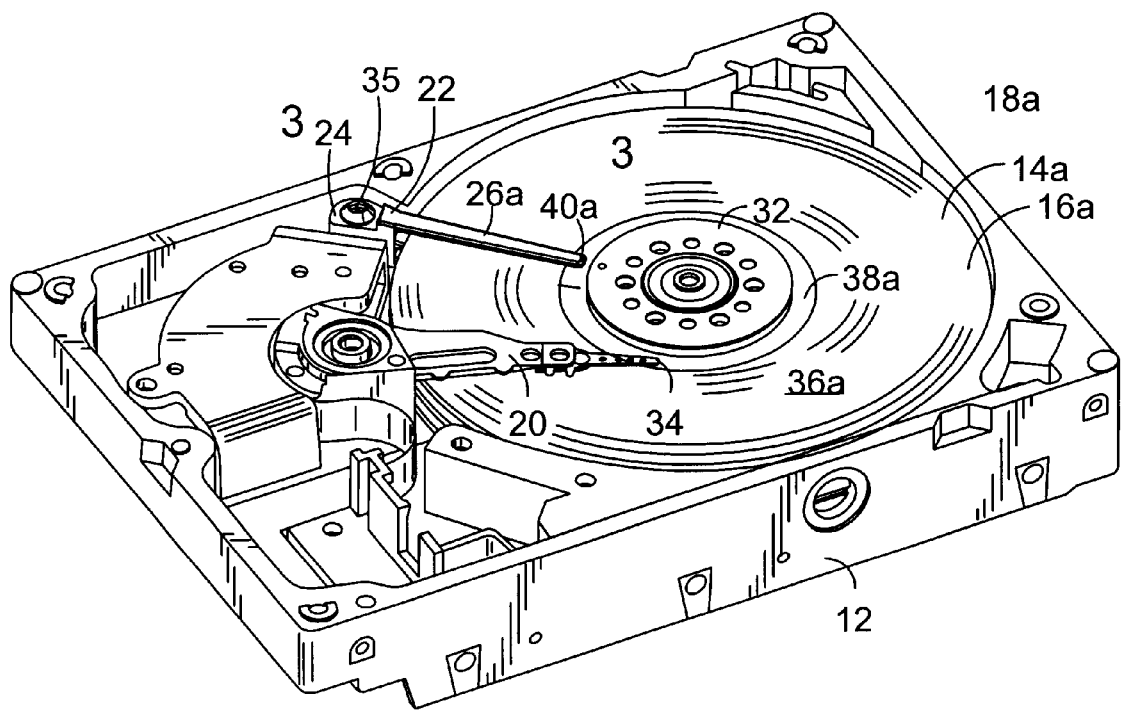
FIG. 1 is a perspective view of a disk drive (cover not shown) including an airflow suppressor comb as constructed in accordance with an aspect of the present invention.

Referring now to the drawings wherein the showings are for purposes of illustrating preferred embodiments of the present invention only, and not for purposes of limiting the same, FIGS. 1–4 illustrate a disk drive and airflow suppressor combs in accordance with aspects of the present invention.

Figure 2:
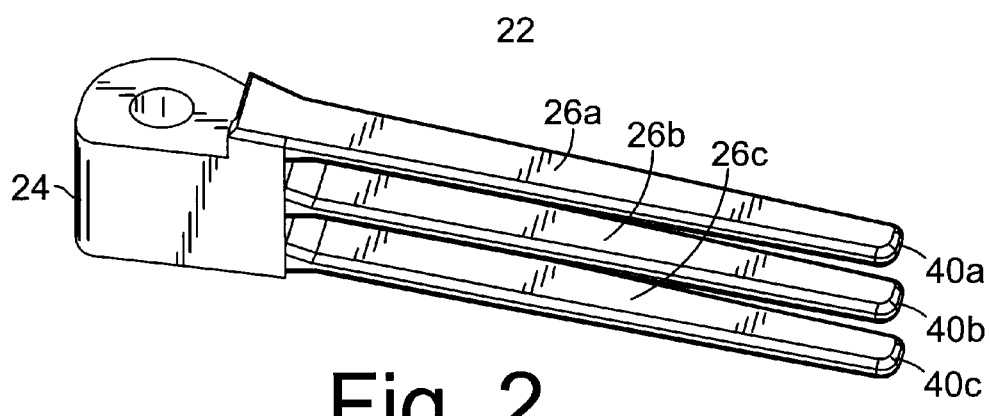
FIG. 2 is a perspective view of the airflow suppressor comb of FIG. 1.
Figure 3:
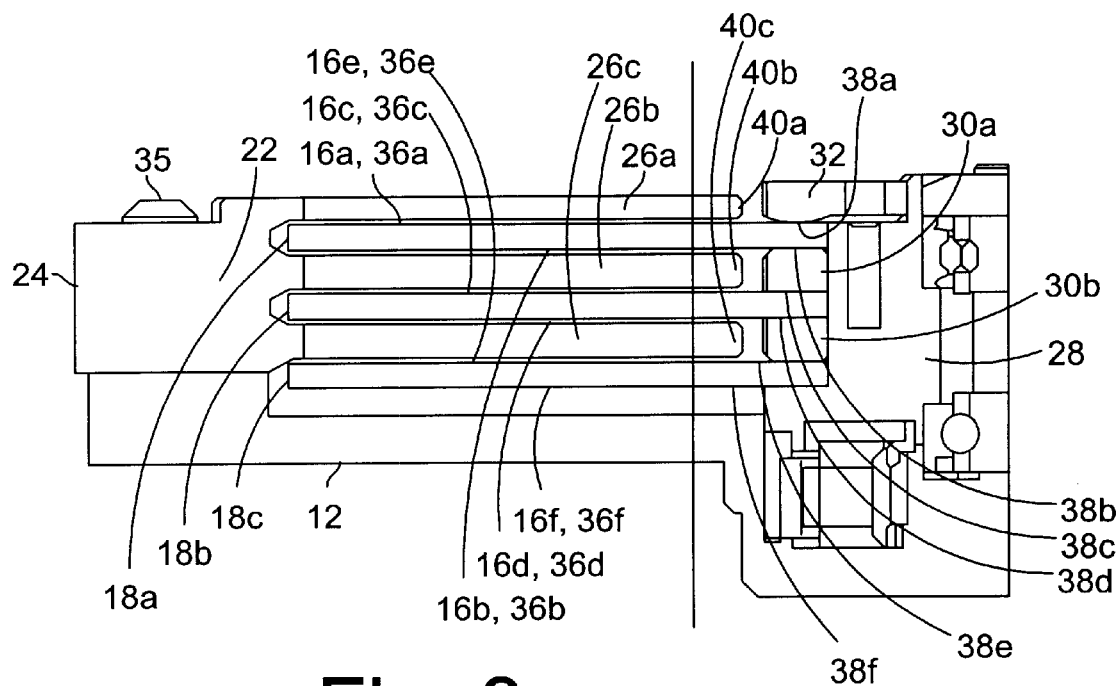
FIG. 3 is a cross-sectional view of a portion of the disk drive of FIG. 1 as seen along axis 3—3.

Referring now to FIGS. 1–3 there is depicted a disk drive 10 constructed in accordance with an aspect of the present invention. The disk drive 10 includes a disk drive base 12. The disk drive 10 further includes rotatable disks 14a–c. However, a single one of the disks 14a–c may be utilized to practice the present invention. The disks 14a–c each respectively include opposing disk surfaces 16a–f. The disk surfaces 16a–f respectively extend to outer disk edges 18a–c. The disk drive 10 further includes a head stack assembly 20 rotatably attached to the disk drive base 12. in operable communication with the disks 14a–c. The disk drive 10 further includes an airflow suppressor comb 22 coupled to the disk drive base 12 and stationary relative to the disk drive base 12 during operation of the disk drive 10. The comb 22 includes a comb body 24 disposed adjacent to the outer disk edges 18a–c. The comb 22 further includes tines 26a–c extending from the comb body 22 respectively along the disk surfaces 16a–e for mitigating disk rotation induced airflow upon the head stack assembly 20 adjacent to the disk surfaces 16a–e. However, a single one of the tines 26a–c may be utilized to practice the present invention.

In further detail according to an embodiment of the present invention, the disk drive base 12 is contemplated to engage a disk drive cover (not shown in FIG. 1) for cooperatively housing the remainder of the components of the disk drive 10. The disk drive 10 includes a spindle motor hub 28 (partially depicted in FIG. 3) rotatably attached to the disk drive base 12. The disks 14a–c are mounted upon the hub 28. Spacers 30a–b separate the disks 14a–c. A disk clamp 32 is used to secure the stacked disks 14a–c to the hub 28. The head stack assembly 20 includes transducer heads (only a single head 34 is depicted in FIG. 1). In this regard, the head stack assembly 20 is configured to rotate relative to the disks 14a–c for reading and writing data therewith.

The airflow suppressor comb 22 may be attached to the disk drive base 12 via a fastener 35 for maintaining the airflow suppressor comb 22 stationary relative to the disk drive base 12. As shown FIG. 1, the disk drive 10 is configured to rotate the disks 14a–c in a counter-clockwise direction. In this regard, the suppressor comb 22 is disposed up-stream of the head stack assembly 20 within a common quadrant relative to the disks 14a–c. It is contemplated that the suppressor comb 22 may be angularly disposed about the disks 14a–c at other locations relative to the head stack assembly 20. Moreover, while the airflow suppressor comb 22 is oriented with the tines 26a–c extending radially with respect to the disks 14a–c, other angular orientations are contemplated.

Rotation of the disks 14a–c results in disk rotation induced airflow about the disk surfaces 16a–f. It is contemplated that the airflow suppressor comb 22 and in particular the tines 26a–c thereof mitigate such disk rotation induced airflow in comparison to a disk drive configuration which does not include the airflow suppressor comb 22. In addition to simply creating a physical barrier to such airflow, the tines 26a–c tend to reduce the relative amount of turbulent airflow resulting in a relatively laminar airflow pattern. As such, this tends to mitigate airflow associated with excitation of the head stack assembly rigid body motion (i.e., arm turbulence), resonance response windage experienced by the head stack assembly 20, and vibration of the disks 14a–c (i.e., disk flutter) in comparison to a disk drive configuration without the airflow suppressor comb 22. In this regard, the present inventors conducted a test utilizing a disk drive whereby off-track displacement was measured during a track follow operation. In a disk drive with a suppressor comb, similar to disk drive 10 constructed in accordance with the present invention, an off-track displacement of the head as a rigid body due to windage (arm turbulence) was determined to have a 1 sigma value of 0.1480 micro inches. In contrast, with the suppressor comb removed, an off-track displacement of the head as a rigid body due to windage (arm turbulence) was determined to have a 1 sigma value of 0.2066 micro inches (a 28% difference).

The disk surfaces 16a–f may each include data annular regions 36a–f and a non-data annular regions 38a–f. Such non-data annular regions 38a–f (typically referred to landing or parking zones) are typically disposed at the interior-most portion of the disk drive surfaces 16a–f. The non-data annular regions 38a–f do not include any recorded data. Thus, when the disk drive 10 is deactivated, the heads may be "parked" at a position where they will not damage the portion of the disk surface containing recorded data. As such, the head stack assembly 20 may be pivoted such that the transducer head 34 is disposed adjacent the non-data annular region 38a, as shown in FIG. 1.

The tines 26a–c respectfully have distal ends 40a–c. Preferably, such distal ends 40a–c are disposed adjacent the non-data annular regions 38a–e. Should the disk drive 10 be subjected to shock of significant magnitude, the tines 26a–c may deflect in a cantilever manner. However, such particular disposition of the distal ends 40a–c of the tines 26a–c would tend to result in the distal ends 40a–c engaging the non-data annular regions 38a–e, rather than the data annular regions 36a–e and possibly damaging the same.

Figure 4:
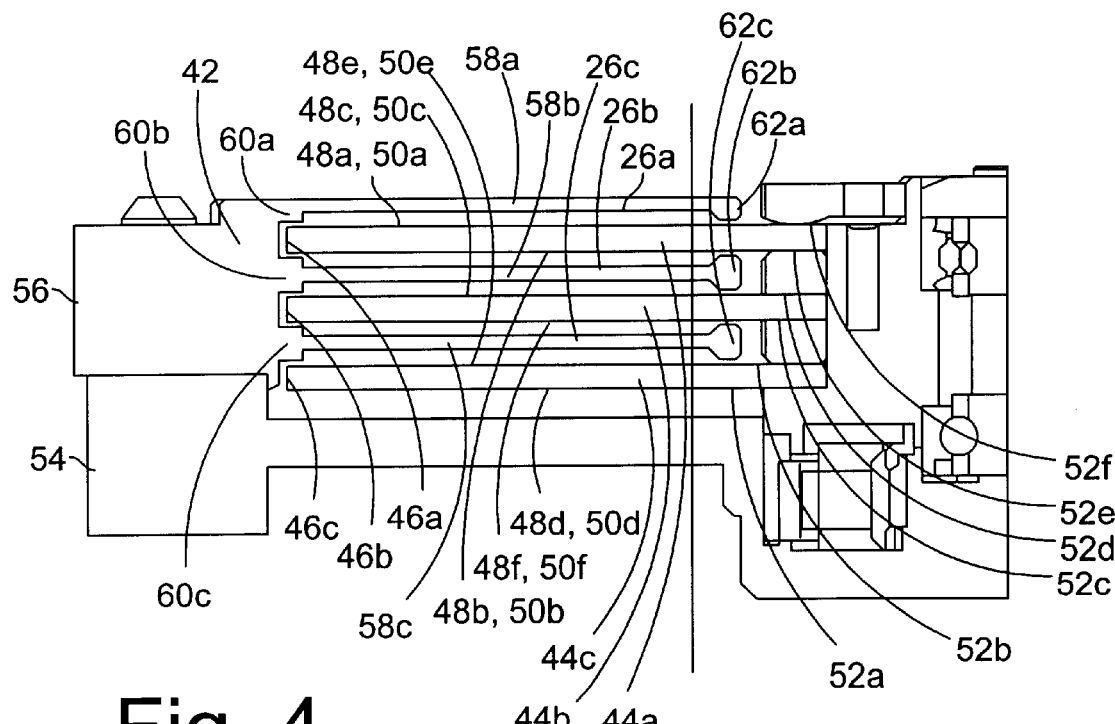
FIG. 4 is a cross-sectional view of a portion of a disk drive similar to the view shown in FIG. 3, however, including an airflow suppressor comb according to another aspect of the present invention.

Referring now to FIG. 4, there is depicted a cross-sectional view of a portion of a disk drive similar to the view shown in FIG. 3, however, including an airflow suppressor comb 42 according to another aspect of the present invention. In this regard, there are depicted disks 44a–c similar to disks 14a–c described above. As such, disks 44a–c respectively include outer disk edges 46a–c and opposing disk surfaces 48a–f. The disk surfaces 48a–f each include data annular regions 50a–f and non data regions 52a–f. The airflow suppressor comb 42 is attached to a disk drive base 54. The airflow suppressor comb 42 includes a comb body 56 and tines 58a–c extending from the comb body 56.

The tines 58a–c respectively include base portions 60a–c disposed adjacent the comb body 56. The base portions 60a–c are sized and configured to contact the outer disk edges 46a–c upon deflection of the disks 44a–c. In this regard, should the associated disk drive be subjected to shock of significant magnitude, the disks 44a–c may tend to rotate in a plane other than their respective axes of rotation. However, the base portions 60a–c are formed to engage the outer disk edges 46a–c thereby mitigating contact between the tines 58a–c and the data annular regions 50a–e.

In addition, the tines 58a–c may inc de distal pedestal portions 62a–c are As sized and configured to contact the non-data annular regions 52a–e of the disks 44a–c upon deflection of the tines 58a c. In this regard, the distal portions 62a–c would tend to engage the non-data annular regions 52a–e, rather than the data annular regions 50a–e upon deflection which may possibly damage the same.

We claim:

1. A disk drive comprising:

a disk drive base;

at least one rotatable disk including a disk surface extending to an outer disk edge, the disk surface includes a data annular region;

a head stack assembly rotatably attached to the disk drive base in operable communication with the disk; and an airflow suppressor comb coupled to the disk drive base and stationary relative to the disk drive base during operation of the disk drive, the comb comprising:
   a comb body disposed adjacent to the outer disk edge; and
   at least one tine extending from the comb body along the data annular region of the disk surface for mitigating disk rotation induced airflow upon the head stack assembly adjacent to the disk surface wherein the disk includes a non-data annular region radially interior to the data annular region, the tine includes a distal portion sized and configured to contact the non-data annular region of the disk upon deflection of the tine.

2. The disk drive of claim 1 wherein the tine includes a base portion disposed adjacent to the comb body, the base portion is sized and configured to contact the outer disk edge upon deflection of the disk.

* * * * *